United States Patent
Umemura et al.

(10) Patent No.: US 9,050,715 B2
(45) Date of Patent: Jun. 9, 2015

(54) BATTERY PACK OF ELECTRIC POWER TOOL

(75) Inventors: Takuya Umemura, Anjo (JP); Masaaki Fukumoto, Anjo (JP); Masafumi Noda, Anjo (JP)

(73) Assignee: MAKITA CORPORATION, Anjo-Shi (JP)

( * ) Notice: Subject to any disclaimer, the term of this patent is extended or adjusted under 35 U.S.C. 154(b) by 716 days.

(21) Appl. No.: 13/209,083

(22) Filed: Aug. 12, 2011

(65) Prior Publication Data

US 2012/0048587 A1 Mar. 1, 2012

Related U.S. Application Data

(60) Provisional application No. 61/379,984, filed on Sep. 3, 2010.

(30) Foreign Application Priority Data

Aug. 30, 2010 (JP) .................. 2010-192239

(51) Int. Cl.
*H01M 6/18* (2006.01)
*B25F 5/02* (2006.01)
*H01M 2/10* (2006.01)
*H01M 10/0525* (2010.01)

(52) U.S. Cl.
CPC .............. *B25F 5/02* (2013.01); *H01M 2/1022* (2013.01); *H01M 2/1055* (2013.01); *H01M 10/0525* (2013.01); *H01M 2220/30* (2013.01); *Y02E 60/122* (2013.01)

(58) Field of Classification Search
CPC ..................... H01M 2/1055; H01M 10/052

USPC ............. 429/322, 323, 231.95, 421; 318/139; 173/213

See application file for complete search history.

(56) References Cited

U.S. PATENT DOCUMENTS 6,286,609 B1 * 9/2001 Carrier et al. ..................... 173/1
6,296,065 B1 * 10/2001 Carrier .......................... 173/217

(Continued)

FOREIGN PATENT DOCUMENTS

JP       2002027675 A     1/2002
JP     A-2003-123846     4/2003

(Continued)

OTHER PUBLICATIONS

The Handbook of Battery, Battery Technology Committee of the Electrochemical Society of Japan, Ohmsha, Ltd., Feb. 10, 2010, 1$^{st}$ edition, 1$^{st}$ print, pp. 606-607.

(Continued)

*Primary Examiner* — Stephen F Gerrity
*Assistant Examiner* — Eyamindae Jallow
(74) *Attorney, Agent, or Firm* — Oliff PLC

(57) ABSTRACT

A battery pack of an electric power tool comprises ten lithium-ion cells. The ten lithium-ion cells are connected in series. Each lithium-ion cell has a diameter equal to or less than 18 millimeters, a length equal to or less than 65 millimeters, and an internal resistance equal to or less than 30 milliohms. Because the battery pack has a high voltage in operation and is therefore able to supply large current, the battery pack is preferably configured incapable of being used in a conventional electric power tool that cannot operate under such a large current.

5 Claims, 7 Drawing Sheets

(56) References Cited

U.S. PATENT DOCUMENTS

| | | | |
|---|---|---|---|
| 6,627,345 B1* | 9/2003 | Zemlok et al. | 429/99 |
| 7,063,170 B2* | 6/2006 | Ortt et al. | 173/29 |
| 7,100,705 B2* | 9/2006 | Ortt et al. | 173/1 |
| 8,071,233 B2* | 12/2011 | Partin et al. | 429/61 |
| 8,579,042 B2* | 11/2013 | Hanawa et al. | 173/2 |
| 2003/0070822 A1* | 4/2003 | Kanzaki et al. | 173/217 |
| 2004/0029426 A1* | 2/2004 | Lui et al. | 439/218 |
| 2004/0163831 A1* | 8/2004 | Ortt et al. | 173/217 |
| 2004/0247999 A1 | 12/2004 | Shirane et al. | |
| 2005/0237686 A1 | 10/2005 | Satoh et al. | |
| 2006/0000623 A1* | 1/2006 | Ortt et al. | 173/1 |
| 2006/0096771 A1 | 5/2006 | Brotto | |
| 2006/0251958 A1* | 11/2006 | Ayala et al. | 429/99 |
| 2007/0026315 A1* | 2/2007 | Lampe-Onnerud et al. | 429/224 |
| 2007/0193761 A1 | 8/2007 | Brotto | |
| 2007/0231680 A1 | 10/2007 | Satoh et al. | |
| 2007/0240892 A1 | 10/2007 | Brotto et al. | |
| 2008/0008928 A1* | 1/2008 | Partin et al. | 429/61 |
| 2009/0071675 A1* | 3/2009 | Hanawa et al. | 173/217 |
| 2009/0181296 A1* | 7/2009 | Lampe-Onnerud et al. | 429/160 |
| 2009/0269654 A1* | 10/2009 | Kairawicz et al. | 429/56 |
| 2010/0047684 A1 | 2/2010 | Okumura et al. | |
| 2011/0012560 A1 | 1/2011 | Sakakibara | |
| 2011/0052966 A1* | 3/2011 | Lampe-Onnerud | 429/156 |
| 2011/0198103 A1* | 8/2011 | Suzuki | 173/46 |
| 2011/0269001 A1* | 11/2011 | Onuki et al. | 429/71 |
| 2012/0227994 A1* | 9/2012 | Yang et al. | 173/1 |

FOREIGN PATENT DOCUMENTS

| | | |
|---|---|---|
| JP | A-2004-095249 | 3/2004 |
| JP | A-2008-518798 | 6/2006 |
| JP | 2007234328 A | 9/2007 |
| JP | 2008293703 A | 12/2008 |
| JP | 2010050002 A | 3/2010 |
| JP | 2010113968 A | 5/2010 |
| WO | 2009/118963 A1 | 10/2009 |

OTHER PUBLICATIONS

Jan. 7, 2014 Office Action issued in Japanese Patent Application No. 2010-192239 (with translation).

Dec. 16, 2014 Office Action issued in Japanese Application No. 2014-026403.

* cited by examiner

BATTERY PACK OF ELECTRIC POWER TOOL

CROSS-REFERENCE TO RELATED APPLICATIONS

This application claims priority to Japanese Patent Application No. 2010-192239 filed on Aug. 30, 2010 and U.S. Provisional Application No. 61/379,984 filed on Sep. 3, 2010, the contents of which are hereby incorporated by reference into the present application.

TECHNICAL FIELD

The present invention relates to a battery pack of an electric power tool, and more particularly to a battery pack having lithium-ion cells.

DESCRIPTION OF RELATED ART

JP 2008-518798 A discloses an electric power tool powered by a battery pack. The battery pack of this electric power tool has a plurality of lithium-ion cells. The lithium-ion cell makes it possible to obtain a high output voltage and merits a high energy density. With the technique described in JP 2008-518798 A, since the lithium-ion cells are used in the battery pack, an output-to-weight ratio of the electric power tool (including the battery pack; same hereinbelow) is increased.

SUMMARY OF THE INVENTION

It is preferable that an electric tool has a high output-to-weight ratio or output-to-volume ratio. For this reason, it is necessary not only to use lithium-ion cells in a battery pack, but also to increase the output-to-weight or output-to-volume ratio of the electric power tool.

To meet the above-mentioned demand, it is necessary to increase the output voltage of the battery pack, without changing the size or number of the lithium-ion cells used therein. Thus, in accordance with the present invention, lithium-ion cells with a small internal resistance are used in the battery pack of the electric power tool. Where the internal resistance of a lithium-ion cell is small, the internal voltage drop in the lithium-ion cell decreases. Since a comparatively high current flows in electric power tools, the internal voltage drop caused by the lithium-ion cells also becomes comparatively large. In particular, in a battery pack in which a plurality of lithium-ion cells is connected in series, the internal voltage drop caused by the lithium-ion cells can surpass the output voltage of one lithium-ion cell or the plurality of lithium-ion cells. By suppressing such an internal voltage drop, it is possible to increase the working voltage of the battery pack (output voltage during conduction), without changing the size or number of the lithium-ion cells used therein. Thus, the output-to-weight or output-to-volume ratio of the electric power tool can be increased.

The inventors have verified that lithium-ion cells having an internal resistance equal to or higher than 30.3 milliohm have been used in the battery packs of conventional electric power tools. Therefore, by using lithium-ion cells having an internal resistance equal to or less than 30 milliohm, it is possible to increase the output-to-weight and output-to-volume ratio over those of the conventional products. The abovementioned value of 30.3 milliohm is obtained by measuring the internal resistance of the conventional lithium-ion cell having a diameter of 18 millimeters and a length of 65 millimeters. Therefore, in accordance with the present invention, a lithium-ion cell that has a diameter equal to or less than 18 millimeters and a length equal to or less than 65 millimeters and also has an internal resistance equal to or less than 30 milliohm is preferred.

On the basis of the above-described findings, it is preferred that the battery pack for an electric power tool disclosed in the present description have at least one lithium-ion cell, wherein the lithium-ion cell has an internal resistance equal to or less than 30 milliohms. In this case, it is preferred that the lithium-ion cell have a diameter equal to or less than 18 millimeters and a length equal to or less than 65 millimeters. With such a configuration, the output of the battery pack can be increased, without changing the size or number of lithium-ion cells with respect to that of the conventional product. As a result, the output-to-weight and output-to-volume ratio of the electric power tool can be increased.

In the above-described electric power tool, lithium-ion cells of a small size can be used. Usually, the decrease in size of lithium-ion cells results in the increased internal resistance thereof. Where the diameter of the above-mentioned conventional lithium-ion cell (diameter 18 millimeters, length 65 millimeters, internal resistance 30.3 milliohms) is reduced to 14 millimeters, the internal resistance thereof becomes 49.2 milliohms. Alternatively, where the length of the conventional lithium-ion cell is assumed to decrease to 45 millimeters, the internal resistance thereof becomes 43.6 milliohms. Therefore, where a lithium-ion cell with a diameter equal to or less than 14 millimeters and a length equal to or less than 65 millimeter is used, it is preferred that this lithium-ion cell have an internal resistance equal to or less than 49 milliohms. Further, where a lithium-ion cell with a diameter equal to or less than 18 millimeters and a length equal to or less than 45 millimeter is used, it is preferred that this lithium-ion cell have an internal resistance equal to or less than 40 milliohms. As a result, the output-to-weight and output-to-volume ratio of the electric power tool can be increased with respect to those of the conventional product.

It is preferable that each of the abovementioned battery packs has a plurality of lithium-ion cells connected in series. Where the plurality of lithium-ion cells is connected in series, the working voltage of the battery pack can be increased. Even when the plurality of lithium-ion cells is connected in series, since the internal resistance of each lithium-ion cell is comparatively small, so the internal resistance of the battery pack can be suppressed to a comparatively low value.

For example, a battery pack having ten lithium-ion cells connected in series can be used. In this case, the nominal voltage of the battery pack can be 36 V and the nominal capacity of the battery pack can be equal to or higher than 1 Ampere-hour.

As described hereinabove, where lithium-ion cells with a low internal resistance are used, the working voltage of the battery pack rises and the output of the electric power tool can be increased. However, where the battery pack using the lithium-ion cells with a small internal resistance is used as a power supply of the conventional electric power tool, a high current supplied by the battery pack can damage the constituent components of the conventional electric power tool. For this reason, the battery pack in accordance with the present invention should be used only with specially designed electric power tools, and it is preferred that the use for the conventional electric power tool be prohibited. Meanwhile, the electric power tool that can use the battery pack in accordance with the present invention can also use, without any problem, the battery packs of the conventional electric power tools.

Based on the above-described findings, the present invention provides the below-described electric power tool system.

This electric power tool system includes a first electric power tool powered by a first battery pack and a second electric power tool powered by a second battery pack. The first and second battery packs include the same number of lithium-ion cells. The first battery pack accommodates lithium-ion cells with an internal resistance lower than that of the lithium-ion cells of the second battery pack. Thus, the first battery pack corresponds to the above-described battery pack in accordance with the present invention, and the second battery pack corresponds to the battery pack of the conventional electric power tool. In this case, it is preferred that the first battery pack be configured capable of being detachably attached to the main body of the first electric power tool. It is also preferred that the second battery pack be configured capable of being detachably attached to the main body of the second electric power tool and also capable of being detachably attached to the main body of the first electric power tool.

BRIEF DESCRIPTION OF THE DRAWINGS

FIG. 8(A) shows schematically a vertical section of the lithium-ion cell. FIG. 8(B) is a cross-sectional view taken along the B-B line in FIG. 8(A) that shows schematically the transverse section of the lithium-ion cell.

DETAILED DESCRIPTION OF THE INVENTION

Representative, non-limiting examples of the present invention will now be described in further detail with reference to the attached drawings. This detailed description is merely intended to teach a person of skill in the art further details for practicing preferred aspects of the present teachings and is not intended to limit the scope of the invention. Furthermore, each of the additional features and teachings disclosed below may be utilized separately or in conjunction with other features and teachings to provide improved battery packs for electric power tools, as well as methods for using and manufacturing the same.

Moreover, combinations of features and steps disclosed in the following detail description may not be necessary to practice the invention in the broadest sense, and are instead taught merely to particularly describe representative examples of the invention. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

Figure 1:
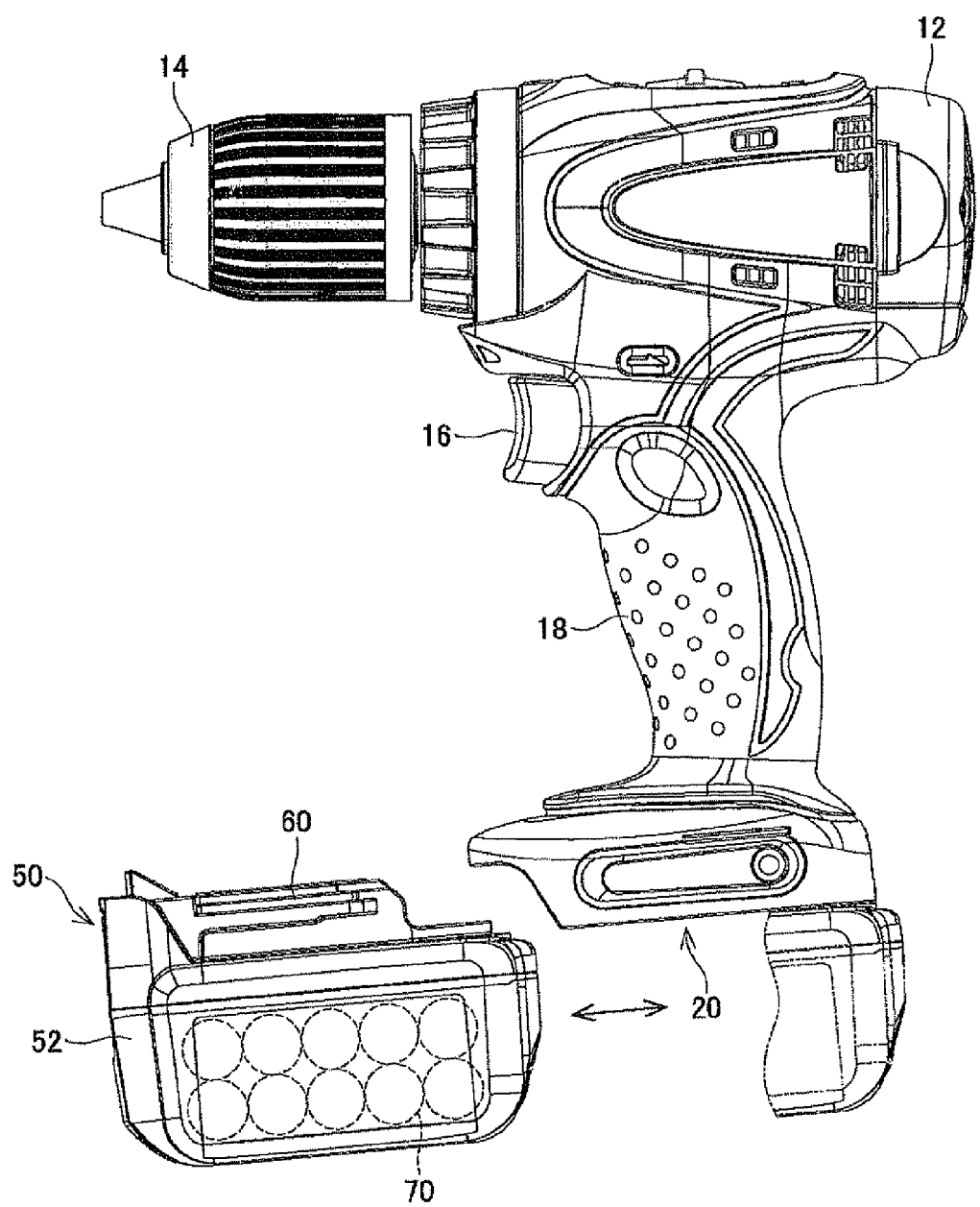
FIG. 1 is a side view of an electric power tool according to an embodiment.
Figure 2:
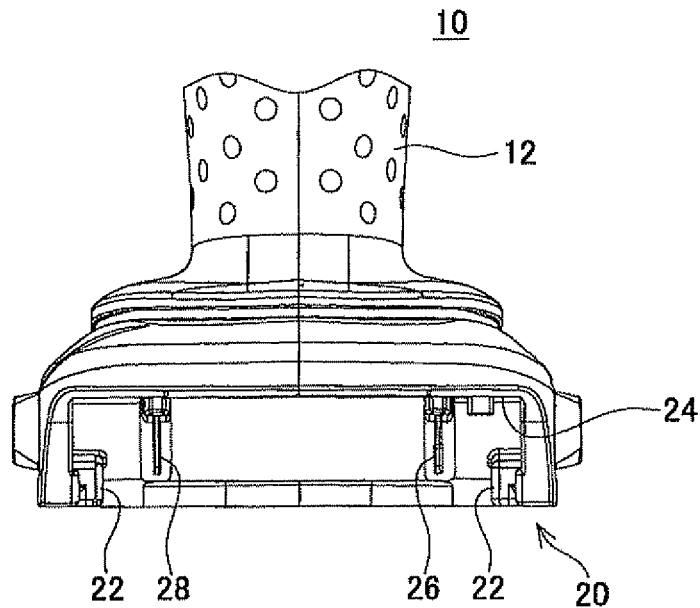
FIG. 2 shows a battery receiving portion of the electric power tool according to the embodiment, as viewed from the front surface (from the left side in FIG. 1).

An electric power tool 10 according to an embodiment will be explained below with reference to the drawings. As shown in FIGS. 1 and 2, the electric power tool 10 is provided with a main body 12 and a battery pack 50 that supplies power to the main body 12 of the electric power tool 10. A tool holder 14 that can be detachably attached to the tool, a main switch 16 operated by the user, and a grip 18 held by the user are provided at the main body 12. A battery receiving portion 20 that can detachably receive the battery pack 50 is provided at the lower end of the grip 18. A motor or a circuit substrate (not shown in the figure) for driving the tool holder 14 is accommodated inside the main body 12. The electric power tool 10 of the present embodiment is, by way of example, an electric power driver, and a driver bit (not shown in the figure) is mounted on the tool holder 14.

The battery pack 50 has a housing 52 and ten lithium-ion cells 70 housed in the housing 52. The ten lithium-ion cells 70 are electrically connected in series. The nominal voltage of each lithium-ion cell 70 is 3.6 V. Therefore, the nominal voltage of the entire battery pack 50 is 36 V. The rated voltage of the electric power tool 10 is also 36 V. A connector portion 60 is provided at the upper surface of the housing 52. The connector portion 60 is detachably engaged with the battery receiving portion 20 of the main body 12.

Figure 3:
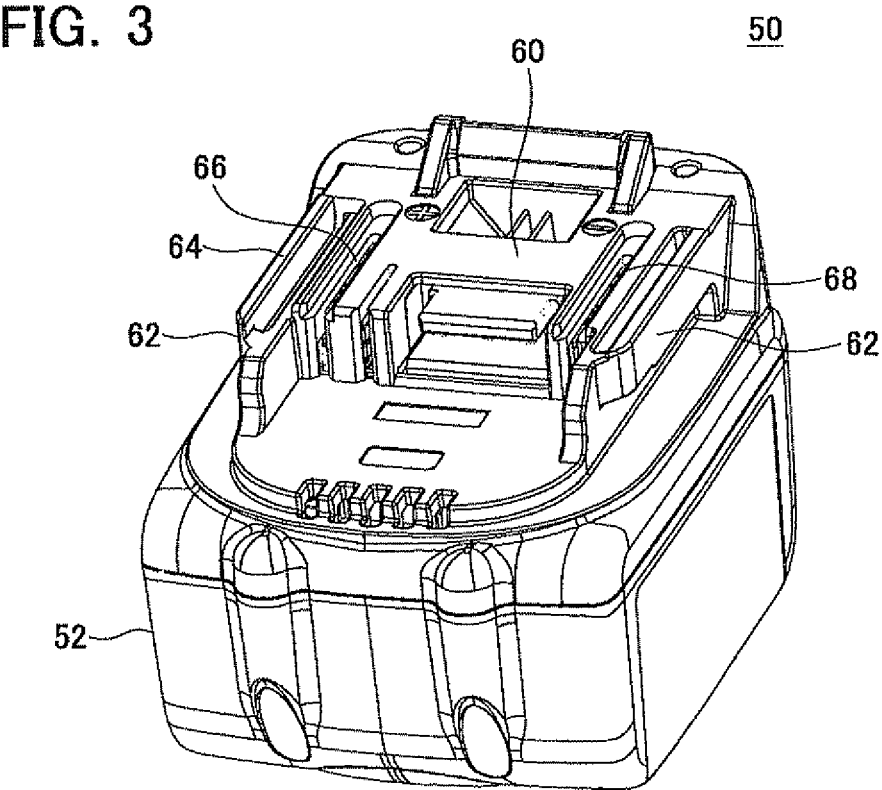
FIG. 3 is a perspective view of a battery pack of the electric power tool according to the embodiment.
Figure 4:
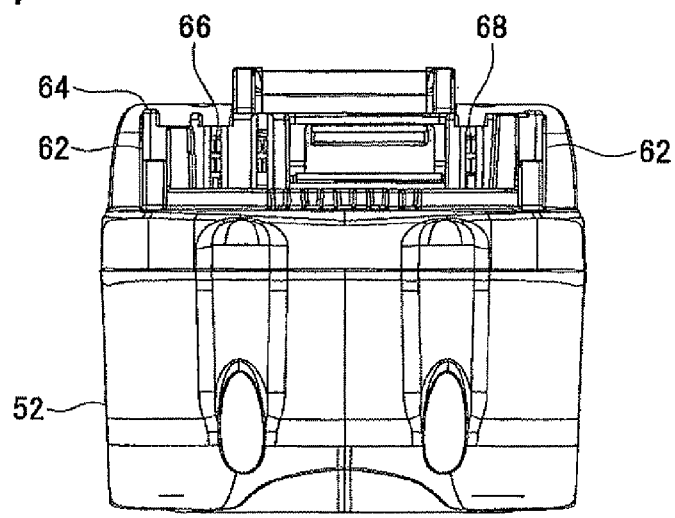
FIG. 4 is a front view of the battery pack of the electric power tool according to the embodiment.

As shown in FIG. 2, a pair of rails 22 is formed at the battery receiving portion 20 of the main body 12. Further, as shown in FIGS. 3 and 4, a pair of rails 62 is also formed in the connector portion 60 of the battery pack 50. The pair of rails 62 of the battery pack 50 is slidably engaged with the pair of rails 22 of the main body 12. As a result, the battery pack 50 is physically connected to the main body 12.

As shown in FIG. 2, the battery receiving portion 20 of the main body 12 is provided with a positive terminal 26 and a negative terminal 28. The positive terminal 26 and the negative terminal 28 are electrically connected to the circuit board and motor located inside the main body 12. As shown in FIGS. 3 and 4, the connector portion 60 of the battery pack 50 is provided with a positive terminal 66 and a negative terminal 68. The positive terminal 66 and the negative terminal 68 are electrically connected to the ten lithium-ion cells 70 that are connected in series. Where the battery pack 50 is attached to the battery receiving portion 20 of the main body 12, the positive terminal 66 and the negative terminal 68 of the battery pack 50 are electrically connected to the positive terminal 26 and the negative terminal 28, respectively, of the main body 12. As a result, the battery pack 50 is electrically connected to the main body 12, and the discharge power of the ten lithium-ion cells 70 is supplied to the circuit board and motor located inside the main body 12.

Figure 9:
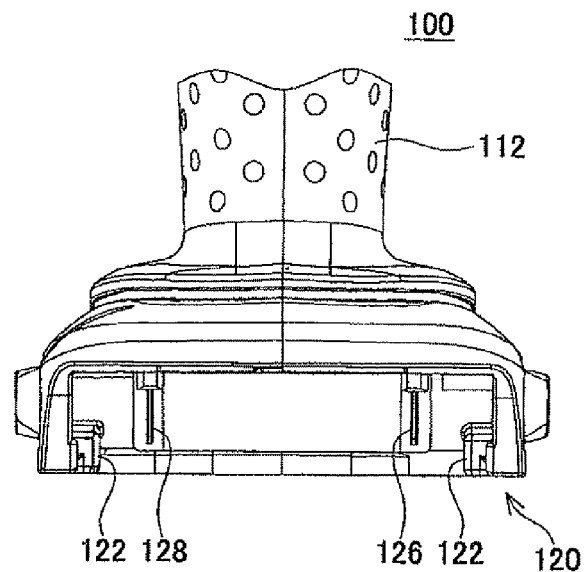
FIG. 9 shows a battery receiving portion of the conventional electric power tool, as viewed from the front surface.
Figure 10:
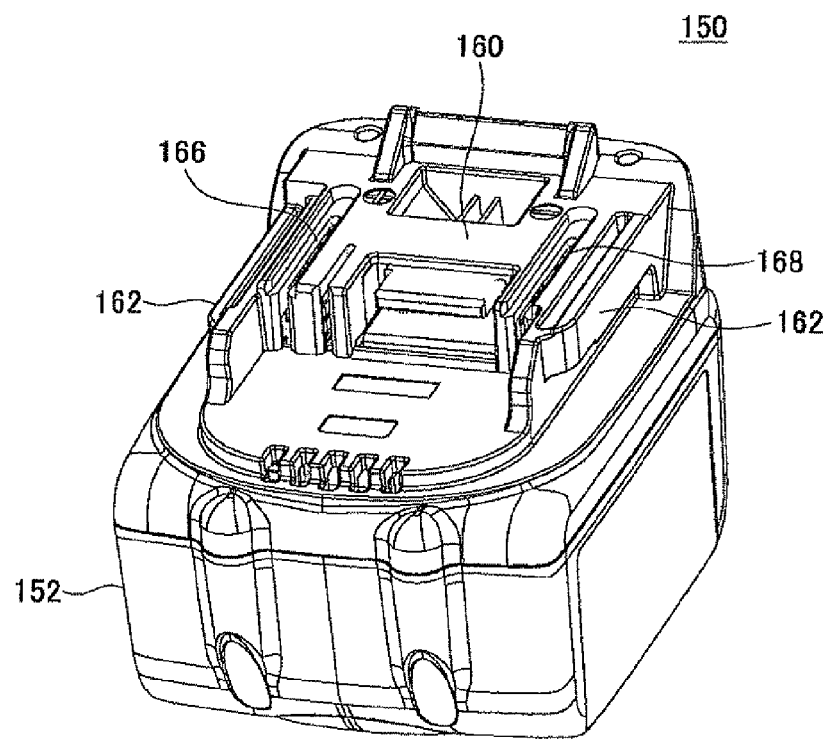
FIG. 10 is a perspective view of a battery pack of the conventional electric power tool.

The attachment structure of the battery pack in the electric power tool 10 according to the above-described embodiment is essentially similar to the attachment structure of a battery pack 150 in a conventional electric power tool 110 shown in FIGS. 9 and 10. Thus, in the conventional electric power tool 110, a battery receiving portion 120 of a main body 112 is also provided with a pair of rails 122, a positive terminal 126, and a negative terminal 128, and a housing 152 of the battery pack 150 is provided with a pair of rails 162, a positive terminal 166, and a negative terminal 168. In this case, similarly to the battery pack 50 of the present embodiment, the conventional battery pack 150 shown in FIG. 10 has ten lithium-ion cells connected in series, and the nominal voltage thereof is 36 V. Thus, the rated voltage of the conventional electric power tool 110 is also 36 V.

Figure 5:
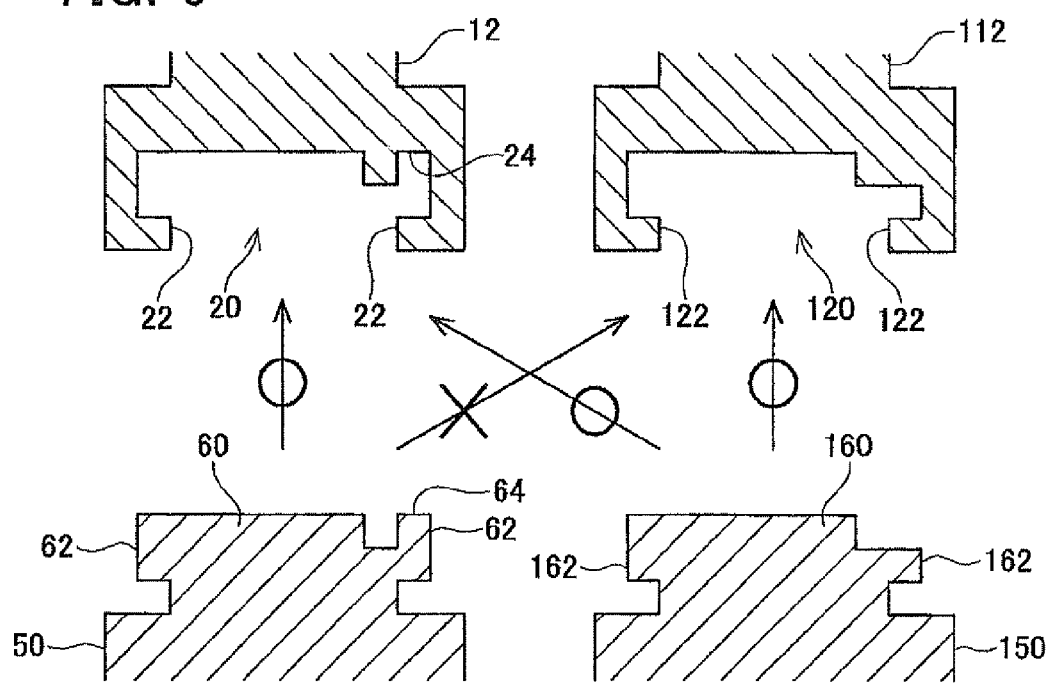
FIG. 5 illustrates schematically the compatibility of the battery pack with the electric power tool according to the embodiment and the conventional electric power tool.

As shown in FIGS. 2, 3, and 4, in the electric power tool 10 of the present embodiment, a rib 64 is formed at the connector portion 60 of the battery pack 50, and a groove 24 for receiving the rib 64 is formed at the battery receiving portion 20 of the main body 12. By contrast, as shown in FIGS. 9 and 10, in the conventional electric power tool 110, no portion corresponding to the abovementioned rib 64 is present at the connector portion 160 of the battery pack 150, and no site corresponding to the abovementioned groove 24 is present at the battery receiving portion 120 of the main body 112. Therefore, as shown schematically in FIG. 5, the battery pack 50 of the present embodiment is configured attachable only to the main body 12 of the present embodiment and cannot be attached to the main body 112 of the conventional electric power tool 110. By contrast, the main body 12 of the present embodiment is configured suitable for use not only with the battery pack 50 of the present embodiment, but also with the battery pack 150 of the conventional electric power tool 110.

As compared with the conventional electric power tool 110, the electric power tool 10 of the present embodiment uses new lithium-ion cells 70 with a low internal resistance. The internal resistance of the new lithium-ion cell 70 is improved to 26.8 milliohms. The new lithium-ion cell 70 is a cylindrical lithium-ion cell and has a diameter of 18 millimeters and a length of 65 millimeters. By using the lithium-ion cells 70 with a low internal resistance, it is possible to inhibit the decrease in internal voltage of the battery pack 50 during conduction. As a result, the working voltage of the battery pack 50 is increased and the output performance of the electric power tool 10 is improved. More specifically, since a high current is supplied from the battery pack 50 to the main body 12, the maximum torque that can be outputted by the electric power tool 10 is increased. Furthermore, since the power loss in the battery pack 50 is reduced, the interval in which the electric power tool 10 can be used is extended.

The nominal voltage of the battery pack 50 of the present embodiment is equal to the nominal voltage of the conventional battery pack 150, but the actual output voltage during conduction of the battery pack 50 of the present embodiment is higher than that of the conventional battery pack 150. Therefore, where the battery pack 50 of the present embodiment is used in the conventional electric power tool 110, the electric current supplied by the battery pack 50 can exceed the level allowed for the main body 112 of the conventional electric power tool 110 and constituent components thereof can be damaged. For this reason, as mentioned hereinabove, the battery pack 50 of the present embodiment is configured such that the attachment thereof to the main body 112 of the conventional electric power tool 110 is impossible and the use thereof on the conventional electric power tool 110 is prohibited (see FIG. 5).

The inventors have measured the internal resistance for three products A, B, C of the conventional lithium-ion cells that have been developed for electric power tools. The conventional three products A, B, C are all cylindrical lithium-ion cells and have a diameter of 18 millimeters and a length of 65 millimeters. According to the measurement results obtained by the inventors, the internal resistance of the conventional product A is 30.3 milliohms, the internal resistance of the conventional product B is 40.0 milliohms, and the internal resistance of the conventional product C is 50.9 milliohms. These measurement results confirmed that among the conventional cylindrical lithium-ion cells that have been used in electric power tools, there is no cell having a diameter equal to or less than 18 millimeters, a length equal to or less than 65 millimeters, and an internal resistance equal to or less than 30 milliohms. The internal resistance of lithium-ion cells slightly varies depending on the measurement method used. A method for measuring the internal resistance according to the present description will be explained below in greater detail.

Figure 6:
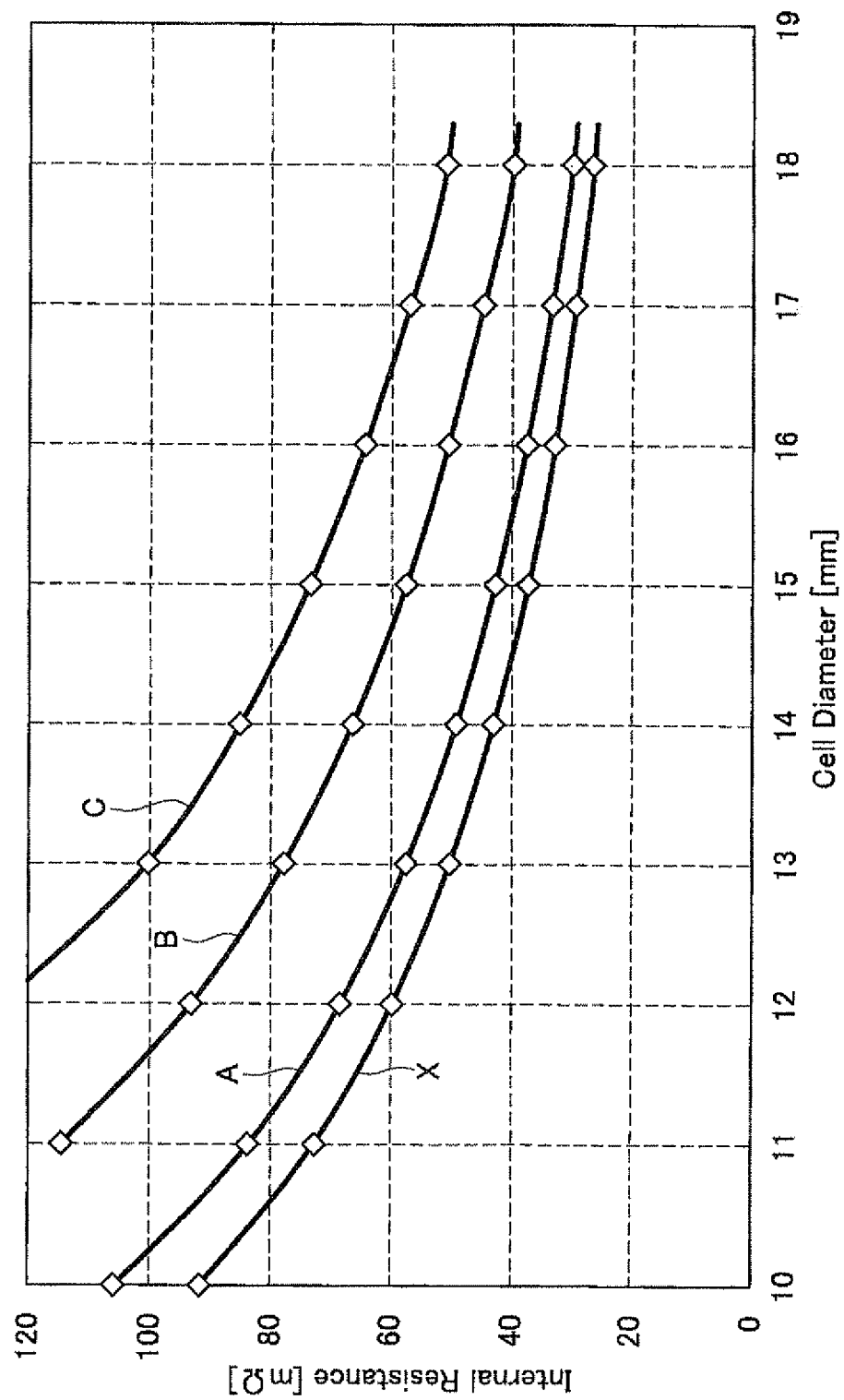
FIG. 6 is a graph illustrating the results obtained in measuring the internal resistance of a lithium-ion cell.

In the electric power tool 10 of the abovementioned embodiment, the size (diameter: 18 millimeters and length: 65 millimeters) of the new lithium-ion cells 70 can be reduced. Typically, where the size of lithium-ion cells is reduced, the internal resistance thereof increases. FIG. 6 shows the relationship between the diameter of a lithium-ion cell (abscissa) and the internal resistance thereof (ordinate). In FIG. 6, a graph X shows the internal resistance of the new lithium-ion cell 70, a graph A shows the internal resistance of the conventional product A, a graph B shows the internal resistance of the conventional product B, and a graph C shows the internal resistance of the conventional product C. Among the internal resistance values shown in FIG. 6, the internal resistance value at a diameter of 18 millimeters is a measured value, and the values at other diameters are estimated values determined by calculations from the measured value. The method for calculating the estimated values will be described below in greater detail.

As shown in FIG. 6, the internal resistance increases as the diameter of the lithium-ion cell decreases. However, in the case of the new lithium-ion cell 70 used in the present embodiment, although the cell diameter is reduced to 14 millimeters, the internal resistance thereof is restricted to a value equal to or less than 43.1 milliohms. This value is on par with the internal resistance of the conventional products A, B, C having the diameter of 18 millimeters. Therefore, with the new lithium-ion cells 70 used in the present embodiment, it is possible to reduce the size and weight of the electric power tool 10 including the battery pack 50, while maintaining the output performance identical to that of the conventional electric power tool 110. In the case of the conventional lithium-ion cells A, B, C, where the diameter is reduced to 14 millimeters, the internal resistance increases to become equal to or greater than 49.2 milliohms.

When the size and weight of the electric power tool 10 are to be reduced, not only the diameter of the lithium-ion cells 70, but also the length of the lithium-ion cells 70 may be decreased. In the case of the lithium-ion cells 70 used in the present embodiment, even when the length is reduced to 45 millimeters, the internal resistance is restricted to a value equal to or less than 38.3 milliohms. This value is on par with the internal resistance of the conventional products A, B, C with the length of 65 millimeters. Therefore, with the new lithium-ion cells 70 used in the present embodiment, the size and weight of the electric power tool 10 including the battery pack 50 can be reduced, while maintaining the output performance identical to that of the conventional electric power tool 110. In the case of the conventional lithium-ion cells, A, B, C, where the length is reduced to 45 millimeters, the internal resistance thereof is increased to at least 43.6 milliohms. These values are also estimated values calculated by the below-described calculation method.

As described hereinabove, with the electric power tool 10 of the present embodiment, where the new lithium-ion cells 70 with a low internal resistance are used, the output performance of the electric power tool 10 is improved without increasing the size or weight of the electric power tool 10. Alternatively, by decreasing the new lithium-ion cells 70 in size, it is possible to decrease the size or weight of the electric power tool 10, while maintaining the output performance identical to that of the conventional electric power tool 110. Further, since the power loss in the battery pack 50 is reduced, the interval in which the electric power tool 10 can be used is extended. Further, even when the battery pack 50 is charged, the power loss is small and the increase in temperature of the new lithium-ion cells 70 is suppressed.

(Method for Measuring the Internal Resistance)

Figure 7:
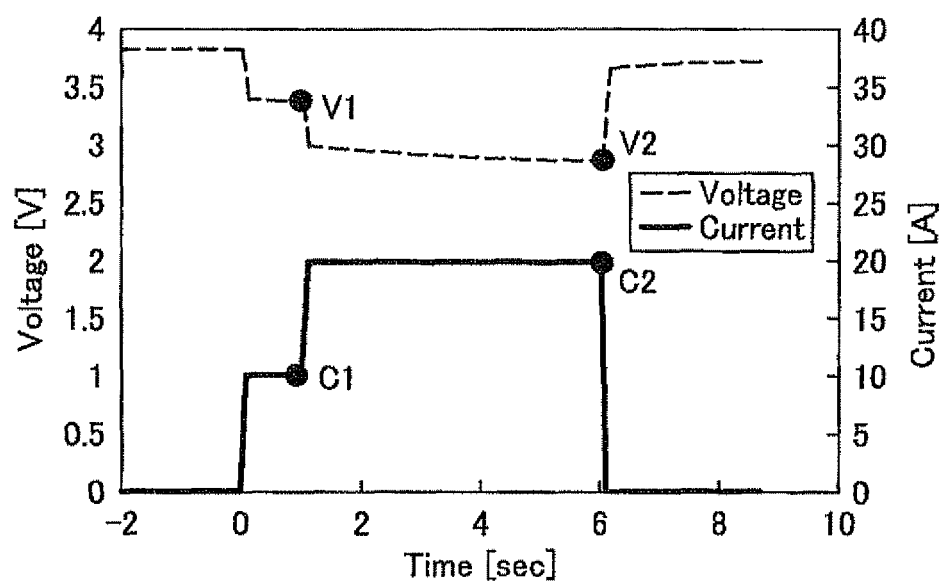
FIG. 7 illustrates measurement conditions for the internal resistance of the lithium-ion cell.

A method for measuring the internal resistance in the present embodiment will be explained below. With this measurement method, first, a discharge depth (charge level) of a lithium-ion cell is set to 50%. More specifically, after the lithium-ion cell is appropriately charged, the quantity of electricity corresponding to a half of the nominal capacitance is discharged. The terminal voltage of the lithium-ion cell is then measured, while discharging the lithium-ion cell. In this case, the ambient temperature is maintained at 25±−1° C., and the temperature of the lithium-ion cell is also 25±1° C. As shown in FIG. 7, when the lithium-ion cell is discharged, the discharge current changes with time. More specifically, in the first 1 sec, the discharge current is adjusted to 10 A, and in the subsequent 5 sec, the discharge current is adjusted to 20 A. The specific feature of this measurement method is that the lithium-ion cell is discharged at a high current, with consideration for the use in an electric power tool. While the lithium-ion cell is thus discharged, the current C1 and voltage V1 are measured after 1 sec has elapsed, and the current C2 and voltage V2 are measured after 6 sec have elapsed. The internal resistance of the lithium-ion cell is determined from the slope of the current-voltage line between the two points in which measurements have been conducted. Thus, the internal resistance R is represented by the following formula.

$$R = (V1-V2)/(C2-C1) \times 1000 \ [m\Omega]$$

(Method for Calculating the Estimated Value of Internal Resistance)

Figure 8A:
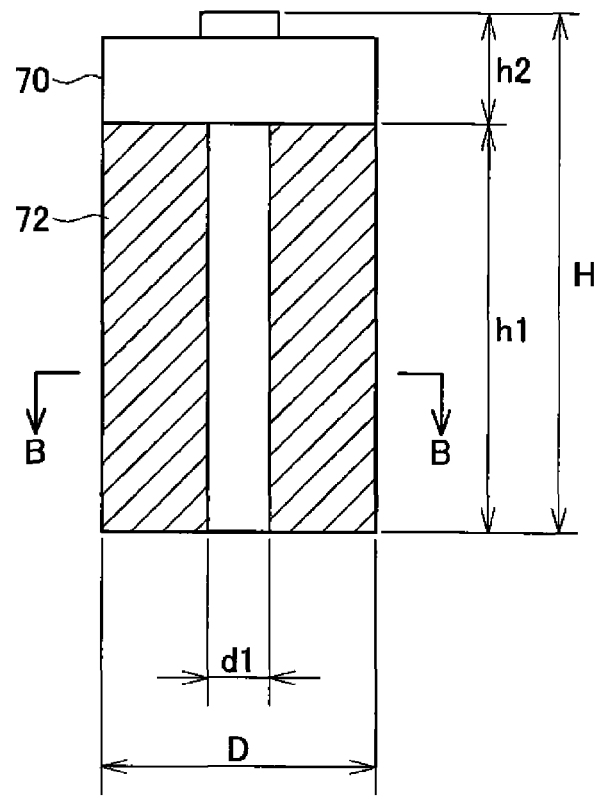
FIG. 8A and FIG. 8B illustrate outer dimensions and effective dimensions of the lithium-ion cell.
Figure 8B:
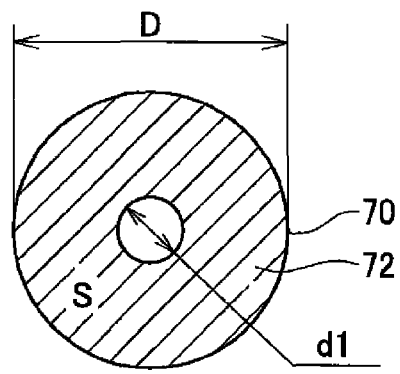

A method for calculating the estimated value of internal resistance in the present embodiment will be explained below. As shown in FIG. 8A and FIG. 8B, an electrode assembly 72 having a positive electrode sheet and a negative electrode sheet wound with a separator being interposed therebetween is accommodated in the lithium-ion cell 70, and the internal resistance of the lithium-ion cell 70 is inversely proportional to the surface area of the electrode assembly 72 spread on a plane. In this case, the surface area of the electrode assembly 72 spread on a plane is proportional to the height h1 of the electrode assembly 72 accommodated in the lithium-ion cell 70 and also proportional to the transverse cross-sectional area S of the electrode assembly 72 accommodated in the lithium-ion cell 70. In this case, the difference h2 between the height H of the lithium-ion cell 70 and the height h1 of the electrode assembly 72 is 7 millimeters. The diameter d1 of the cavity formed in the center of the electrode assembly 72 is 5 millimeters. The share of structural resistance fraction created by the collector or the like in the internal resistance of the lithium-ion cell 70 is 5 milliohms.

Therefore, it can be calculated that when the new lithium-ion cell 70 having the diameter of 18 millimeters, the length of 65 millimeters, and the internal resistance of 26.8 milliohms, is reduced in diameter to 14 millimeters, the internal resistance thereof will become 43.1 milliohms. Alternatively, it can be calculated that when the new lithium-ion cell 70 is reduced in length to 45 millimeters, the internal resistance thereof will become 38.3 milliohms. Likewise, it can be calculated that when the lithium-ion cell that is the conventional product A having the diameter of 18 millimeters, the length of 65 millimeters, and the internal resistance of 30.3 milliohms, is reduced in diameter to 14 millimeters, the internal resistance thereof will become 49.2 milliohms. Alternatively, it can be calculated that when the lithium-ion cell that is the conventional product A is reduced in length to 45 millimeters, the internal resistance thereof will become 43.6 milliohms.

The embodiments of the present invention are described above in detail, but these embodiments are merely exemplary and place no limitation on the patent claims. Thus, the technical scope of the claims includes various modifications and changes of the above-described specific examples. In particular, the actual diameter and length of the battery cells do not necessarily strictly match the dimensions (diameter: 18 millimeters and length: 65 millimeters) explained in the present detailed description of the invention, and a certain difference in dimensions (several millimeters) may be present.

What is claimed is:

1. An electric power tool system comprising:
   a first electric power tool powered by a first battery pack, the first battery pack comprising at least one lithium-ion cell, wherein the lithium-ion cell has a diameter equal to or less than 18 millimeters, a length equal to or less than 65 millimeters, and an internal resistance equal to or less than 30 milliohms; and
   a second electric power tool powered by a second battery pack;
   wherein the first battery pack and the second battery pack comprise the same number of lithium-ion cells,
   the internal resistance of the lithium-ion cell of the first battery pack is lower than an internal resistance of the lithium-ion cell of the second battery pack,
   the first battery pack is configured capable of being detachably attached to a main body of the first electric power tool but is configured incapable of being attached to a main body of the second electric power tool, and
   the second battery pack is configured capable of being detachably attached to the main body of the second electric power tool and is configured capable of being attached to the main body of the first electric power tool.

2. The system as in claim 1, wherein the first battery pack includes a plurality of lithium-ion cells connected in series.

3. The system as in claim 1, wherein the first battery pack includes ten lithium-ion cells connected in series, a nominal voltage of the first battery pack is equal to 36 volts and a nominal capacity of the first battery pack is equal to or more than 1 Ampere-hour.

4. An electric power tool system comprising:
   a first electric power tool powered by a first battery pack, the first battery pack comprising at least one lithium-ion cell, wherein the lithium-ion cell has a diameter equal to or less than 14 millimeters, a length equal to or less than 65 millimeters, and an internal resistance equal to or less than 49 milliohms; and
   a second electric power tool powered by a second battery pack;
   wherein the first battery pack and the second battery pack comprise the same number of lithium-ion cells,
   the internal resistance of the lithium-ion cell of the first battery pack is lower than an internal resistance of the lithium-ion cell of the second battery pack, the first battery pack is configured capable of being detachably attached to a main body of the first electric power tool but is configured incapable of being attached to a main body of the second electric power tool, and the second battery pack is configured capable of being detachably attached to the main body of the second electric power tool and is configured capable of being attached to the main body of the first electric power tool.

5. An electric power tool system comprising:

a first electric power tool powered by a first battery pack, the first battery pack comprising at least one lithium-ion cell, wherein the lithium-ion cell has a diameter equal to or less than 18 millimeters, a length equal to or less than 45 millimeters, and an internal resistance equal to or less than 40 milliohms; and a second electric power tool powered by a second battery pack;

wherein the first battery pack and the second battery pack comprise the same number of lithium-ion cells, the internal resistance of the lithium-ion cell of the first battery pack is lower than an internal resistance of the lithium-ion cell of the second battery pack, the first battery pack is configured capable of being detachably attached to a main body of the first electric power tool but is configured incapable of being attached to a main body of the second electric power tool, and the second battery pack is configured capable of being detachably attached to the main body of the second electric power tool and is configured capable of being attached to the main body of the first electric power tool.

* * * * *